(12) United States Patent
Sahu (10) Patent No.: US 7,919,204 B2
(45) Date of Patent: Apr. 5, 2011

(54) THERMAL CONTROL OF A FLOW CELL BATTERY

(75) Inventor: Saroj Kumar Sahu, Mountain House, CA (US)

(73) Assignee: Deeya Energy, Inc., Fremont, CA (US)

(*) Notice: Subject to any disclaimer, the term of this patent is extended or adjusted under 35 U.S.C. 154(b) by 0 days.

(21) Appl. No.: 12/577,127

(22) Filed: Oct. 9, 2009

(65) Prior Publication Data

US 2010/0092813 A1 Apr. 15, 2010

Related U.S. Application Data

(60) Provisional application No. 61/104,614, filed on Oct. 10, 2008.

(51) Int. Cl.
*H01M 8/20* (2006.01)
*H01M 10/50* (2006.01)
*H01M 4/36* (2006.01)
*H01M 8/04* (2006.01)

(52) U.S. Cl. ......... 429/105; 429/62; 429/120; 429/498; 429/515

(58) Field of Classification Search ............... 429/13, 429/24, 61, 18, 50, 27, 62, 71, 72, 101, 129, 429/105, 131, 120, 515, 498; 320/128; 165/287
See application file for complete search history.

(56) References Cited

U.S. PATENT DOCUMENTS

| | | | |
|---|---|---|---|
| 3,540,934 A * | 11/1970 | Boeke | 429/18 |
| 3,996,064 A | 12/1976 | Thaller | |
| 4,133,941 A | 1/1979 | Sheibley | |
| 4,159,366 A | 6/1979 | Thaller | |
| 4,309,372 A | 1/1982 | Sheibley | |
| 4,312,735 A | 1/1982 | Grimes et al. | |
| 4,414,090 A | 11/1983 | D'Agostino et al. | |
| 4,454,649 A | 6/1984 | Jalan et al. | |
| 4,468,441 A | 8/1984 | D'Agostino et al. | |
| 4,485,154 A | 11/1984 | Remick et al. | |
| 4,496,637 A | 1/1985 | Shimada et al. | |
| 4,543,302 A | 9/1985 | Gahn et al. | |
| 4,572,878 A * | 2/1986 | Daugherty | 429/62 |
| 4,732,827 A | 3/1988 | Kaneko et al. | |
| 4,784,924 A | 11/1988 | Savinell et al. | |
| 4,814,241 A | 3/1989 | Nagashima et al. | |
| 4,828,666 A | 5/1989 | Iizuka et al. | |
| 4,874,483 A | 10/1989 | Wakabayashi et al. | |
| 4,882,241 A | 11/1989 | Heinzel | |

(Continued)

FOREIGN PATENT DOCUMENTS

DE 102006007206 10/2006

(Continued)

OTHER PUBLICATIONS

PCT International Search Report and the Written Opinion mailed Dec. 14, 2009, in related International Application No. PCT/US2009/060276.

(Continued)

*Primary Examiner* — Jonathan Crepeau
*Assistant Examiner* — Kenneth Douyette
(74) *Attorney, Agent, or Firm* — Haynes and Boone, LLP (57) ABSTRACT

A flow battery with thermal management is presented. The flow battery is housed in an enclosure where fluid is uniformly circulated about holding tanks of electrolyte to control the temperature inside the enclosure.

15 Claims, 9 Drawing Sheets

U.S. PATENT DOCUMENTS

| | | | |
|---|---|---|---|
| 4,894,294 | A | 1/1990 | Ashizawa et al. |
| 4,929,325 | A | 5/1990 | Bowen et al. |
| 4,945,019 | A | 7/1990 | Bowen et al. |
| 4,948,681 | A | 8/1990 | Zagrodnik et al. |
| 4,956,244 | A | 9/1990 | Shimizu et al. |
| 5,061,578 | A | 10/1991 | Kozuma et al. |
| 5,162,168 | A | 11/1992 | Downing et al. |
| 5,188,911 | A | 2/1993 | Downing et al. |
| 5,258,241 | A | 11/1993 | Ledjeff et al. |
| 5,366,824 | A | 11/1994 | Nozaki et al. |
| 5,385,793 | A | 1/1995 | Tiedemann et al. |
| 5,648,184 | A | 7/1997 | Inoue et al. |
| 5,656,390 | A | 8/1997 | Kageyama et al. |
| 5,665,212 | A | 9/1997 | Zhong et al. |
| 5,753,384 | A | 5/1998 | Kimberg |
| 5,759,711 | A | 6/1998 | Miyabayashi et al. |
| 5,851,694 | A | 12/1998 | Miyabayashi et al. |
| 6,005,183 | A | 12/1999 | Akai et al. |
| 6,040,075 | A | 3/2000 | Adcock et al. |
| 6,086,643 | A | 7/2000 | Clark et al. |
| 6,461,772 | B1 | 10/2002 | Miyake et al. |
| 6,475,661 | B1 | 11/2002 | Pellegri et al. |
| 6,509,119 | B1 | 1/2003 | Kobayashi et al. |
| 6,524,452 | B1 | 2/2003 | Clark et al. |
| 6,555,267 | B1 | 4/2003 | Broman et al. |
| 6,562,514 | B1 | 5/2003 | Kazacos et al. |
| 6,692,862 | B1 | 2/2004 | Zocchi |
| 6,759,158 | B2 | 7/2004 | Tomazic |
| 6,761,945 | B1 | 7/2004 | Adachi et al. |
| 6,764,789 | B1 | 7/2004 | Sekiguchi et al. |
| 6,905,797 | B2 | 6/2005 | Broman et al. |
| 6,936,372 | B1 | 8/2005 | Jagota et al. |
| 6,986,966 | B2 | 1/2006 | Clarke et al. |
| 7,061,205 | B2 | 6/2006 | Shigematsu et al. |
| 7,078,123 | B2 | 7/2006 | Kazacos et al. |
| 7,157,883 | B2 | 1/2007 | Johnson et al. |
| 7,199,550 | B2 | 4/2007 | Tsutsui et al. |
| 7,220,515 | B2 | 5/2007 | Ito et al. |
| 7,227,275 | B2 | 6/2007 | Hennessy et al. |
| 2002/0134544 | A1 | 9/2002 | DeVilbiss et al. |
| 2003/0008203 | A1 | 1/2003 | Winter |
| 2004/0170893 | A1 | 9/2004 | Nakaishi et al. |
| 2004/2002915 | | 10/2004 | Nakaishi et al. |
| 2004/0241544 | A1 | 12/2004 | Nakaishi et al. |
| 2005/0074653 | A1 | 4/2005 | Broman et al. |
| 2005/0156431 | A1 | 7/2005 | Hennessy |
| 2005/0156432 | A1 | 7/2005 | Hennessy |
| 2005/0158615 | A1 | 7/2005 | Samuel et al. |
| 2005/0164075 | A1 | 7/2005 | Kumamoto et al. |
| 2005/0181273 | A1 | 8/2005 | Deguchi et al. |
| 2005/0260473 | A1 | 11/2005 | Wang |
| 2006/0108984 | A1* | 5/2006 | Johnson et al. ............... 320/128 |
| 2007/0072067 | A1 | 3/2007 | Symons et al. |
| 2007/0080666 | A1 | 4/2007 | Ritter et al. |
| 2007/0111089 | A1 | 5/2007 | Swan |
| 2008/0233437 | A1 | 9/2008 | Muramatsu et al. |
| 2008/0241643 | A1 | 10/2008 | Lepp et al. |
| 2010/0003586 | A1 | 1/2010 | Sahu |
| 2010/0092807 | A1 | 4/2010 | Sahu |
| 2010/0092813 | A1 | 4/2010 | Sahu |
| 2010/0092843 | A1 | 4/2010 | Conway |
| 2010/0094468 | A1 | 4/2010 | Sahu |
| 2010/0136455 | A1 | 6/2010 | Winter |

FOREIGN PATENT DOCUMENTS

| | | |
|---|---|---|
| JP | 60047373 | 3/1985 |
| JP | 60070672 | 4/1985 |
| JP | 60115174 | 6/1985 |
| JP | 1060967 | 3/1989 |
| JP | 1320776 | 12/1989 |
| JP | 2027667 | 1/1990 |
| JP | 2027668 | 1/1990 |
| JP | 3017963 | 1/1991 |
| JP | 8007913 | 1/1996 |
| JP | 10012260 | 1/1998 |
| JP | 10208766 | 8/1998 |
| JP | 11329474 | 11/1999 |
| JP | 2000058099 | 2/2000 |
| JP | 2000200619 | 7/2000 |
| JP | 2002015762 | 1/2002 |
| JP | 2002175822 | 6/2002 |
| JP | 2002289233 | 10/2002 |
| JP | 2002367661 | 12/2002 |
| JP | 2003173812 | 6/2003 |
| JP | 2005142056 | 6/2005 |
| JP | 2005228622 | 8/2005 |
| JP | 2005228633 | 8/2005 |
| JP | 2005322447 | 11/2005 |
| JP | 2006114360 | 4/2006 |
| JP | 2006147306 | 6/2006 |
| JP | 2006147376 | 6/2006 |
| JP | 2006313691 | 11/2006 |
| JP | 2006351346 | 12/2006 |
| JP | 2007087829 | 4/2007 |
| WO | 8905528 | 6/1989 |
| WO | 9003666 | 4/1990 |
| WO | 03005476 | 1/2003 |
| WO | 2004079849 | 9/2004 |
| WO | 2006135958 | 12/2006 |

OTHER PUBLICATIONS

Search Report for PCT Application No. PCT/US2009/049285, Jan. 7, 2010.

* cited by examiner

THERMAL CONTROL OF A FLOW CELL BATTERY

CROSS-REFERENCE TO RELATED APPLICATIONS

The present application claims benefit under 35 U.S.C. §119(e) of U.S. Provisional Application No. 61/104,614 filed on Oct. 10, 2008, entitled "Thermal Control Of A Flow Cell Battery," the content of which is hereby incorporated by reference in its entirety.

BACKGROUND

1. Technical Field

The present invention is related to controlling a flow cell battery and, in particular, to thermal control of a flow cell battery.

2. Discussion of Related Art

Reduction-oxidation (redox) flow batteries store electrical energy in a chemical form, and subsequently dispense the stored energy in an electrical form via a spontaneous reverse redox reaction. A redox flow battery is an electrochemical storage device in which an electrolyte containing one or more dissolved electro-active species flows through a reactor cell where chemical energy is converted to electrical energy. Conversely, the discharged electrolyte can be flowed through a reactor cell such that electrical energy is converted to chemical energy. Electrolyte is stored externally, for example in tanks, and flowed through a set of cells where the electrochemical reaction takes place. Externally stored electrolytes can be flowed through the battery system by pumping, gravity feed, or by any other method of moving fluid through the system. The reaction in a flow battery is reversible; the electrolyte can be recharged without replacing the electroactive material. The energy capacity of a redox flow battery, therefore, is related to the total electrolyte volume (i.e., the size of the storage tank). The discharge time of a redox flow battery at full power also depends on electrolyte volume and can vary from several minutes to many days.

The minimal unit that performs the electrochemical energy conversion is generally called a "cell," whether in the case of flow batteries, fuel cells, or secondary batteries. A device that integrates many such cells, coupled electrically in series and/or parallel to get higher current, voltage, or both, is generally called a "battery." However, it is common to refer to any collection of coupled cells, including a single cell used on its own, as a battery. As such, a single cell can be referred to interchangeably as a "cell" or a "battery."

Redox flow batteries can be utilized in many technologies that require the storage of electrical energy. For example, redox flow batteries can be utilized to store night-time electricity that is inexpensive to produce, and to subsequently provide electricity during peak demand when electricity is more expensive to produce or demand is beyond the capability of current production. Such batteries can also be utilized for storage of green energy (i.e., energy generated from renewable sources such as wind, solar, wave, or other non-conventional sources). Flow redox batteries can be utilized as uninterruptible power supplies in place of more expensive backup generators. Efficient methods of power storage can be used to construct devices having a built-in backup that mitigates the effects of power cuts or sudden power failures. Power storage devices can also reduce the impact of a failure in a generating station.

Other situations where uninterruptible power supplies can be of importance include, but are not limited to, buildings where uninterrupted power is critical, such as hospitals. Such batteries can also be utilized for providing an uninterruptible power supply in developing countries, many of which do not have reliable electrical power sources, resulting in intermittent power availability.

In a flow battery, the electrolyte is typically a multi-salt solution. The solubility of each salt in the presence of other salts depends upon the relative concentrations of each salt and the temperature. Usually, all the salts are soluble within a certain temperature range and precipitate outside of the range, resulting in damage to the flow battery system and reduced efficiency of the flow battery system.

The internal resistance of a flow battery depends upon the electrolyte solution temperature. Typically, as the electrolyte temperature increases, the internal resistance decreases and hence the efficiency of the system increases. Therefore, to operate the battery system efficiently, the flow battery system can be operated at a high temperature. However, in certain chemistries, one or more electrolyte salts may decompose in the solution at high temperatures, resulting in permanent damage to or temporary loss of efficiency in the system. Also at higher temperatures, parasitic reactions (e.g., $H_2$ or $O_2$ generation) may occur, which can offset the efficiency gains noted above.

Therefore, operation of a flow cell battery is optimal when the electrolyte temperature is maintained within a certain range (i.e., efficient operating range). A redox flow battery operates efficiently within a range of temperatures, for example, between about 30° C. and about 50° C. However, the flow battery may experience a thermal environment which varies widely over time. For example, temperatures may be hot during the day and cold at night, varying by tens of degrees over the course of a twenty-four hour period. Conventional flow batteries employ heaters and coolers to control the temperature of the electrolyte. However, these techniques result in additional equipment costs and higher operating costs. Hence, it is desirable to have a thermal control technique for maintaining electrolyte temperature which consumes minimal amounts of energy and which does not use heaters and/or coolers.

SUMMARY

Consistent with embodiments of the present invention, a flow cell battery can include at least one tank for holding electrolyte solution; an enclosure surrounding the at least one tank, the enclosure having an inside and an outside, wherein a first fluid; and a manifold thermally coupled between the enclosure and the at least one tank, the manifold allowing circulation of a fluid around the at least one tank.

These and other embodiments of the present invention are further described below with reference to the following figures.

BRIEF DESCRIPTION OF THE DRAWINGS

In order to more fully understand the present invention, reference is made to the accompanying drawings, with the understanding that these drawings are not intended to limit the scope of the invention.

In the figures, elements having the same designation have the same or substantially similar function. The figures are illustrative only. Relative sizes and distances depicted in the figures are for convenience of illustration and have no further meaning.

DETAILED DESCRIPTION

In the following description, for the purposes of explanation, specific details are set forth in order to provide a thorough understanding of the embodiments of the invention. However, it will be apparent that the invention may be practiced without these specific details.

A reduction-oxidation (redox) flow cell is the minimal component of a redox battery. Multiple flow cells can be coupled (e.g., "stacked") to form a multi-cell battery. The cell is made up of two half-cells separated by a membrane, through which ions are transferred during a redox reaction. One half-cell contains an anolyte and the other half-cell contains a catholyte, the anolyte and catholyte being collectively referred to as electrolytes. The electrolytes (anolyte and catholyte) are flowed through the half-cells, often with an external pumping system. At least one electrode in each half cell provides a surface on which the redox reaction takes place and from which charge is transferred.

The redox flow cell works by changing the oxidation state of its constituents during charging or discharging. The two half-cells of the basic redox flow cell are connected in series by the conductive electrolytes, one for anodic reaction and the other for cathodic reaction. The electrode in each half-cell includes a defined surface area upon which the redox reaction takes place. Electrolyte flows through the half-cell as the redox reaction takes place. The two half-cells are separated by an ion-exchange membrane (IEM) where either positive ions or negative ions pass through the membrane. Multiple such cells can be electrically coupled (e.g., "stacked") in series to achieve higher voltage, in parallel in order to achieve higher current, or both. The reactant electrolytes are stored in separate tanks and dispensed into the cells as necessary in a controlled manner to supply electrical power to a load.

Figure 1:
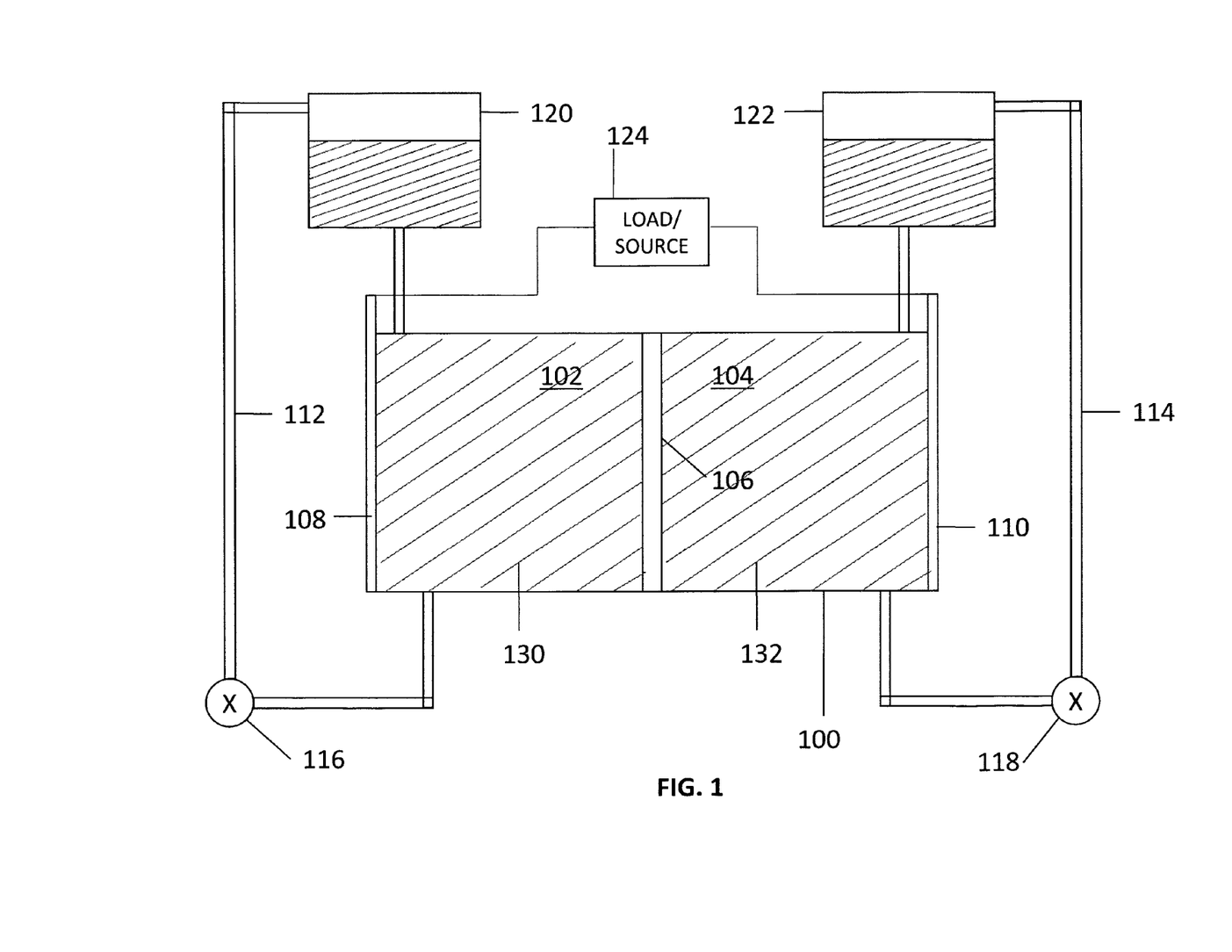
FIG. 1 illustrates a reduction-oxidation cell.

FIG. 1 illustrates a redox flow cell 100 consistent with some embodiments of the present invention. Redox flow cell 100 includes two half-cells 102 and 104 separated by an ion exchange membrane (IEM) 106. Half-cells 102 and 104 include electrodes 108 and 110, respectively, in contact with an electrolyte 130 or 132, respectively, such that an anodic reaction occurs at the surface of one of electrodes 108 or 110 and a cathodic reaction occurs at the surface of the other one of electrodes 108 or 110. Electrolyte 130 or 132 flows through each of half-cells 102 and 104 as the redox reaction takes place.

As shown in FIG. 1, the electrolyte 130 in half-cell 102 may be pumped through pipe 112 by pump 116 to holding tank 120. Similarly, the electrolyte 132 in half-cell 104 can be pumped through pipe 114 by pump 118 to holding tank 122. In some embodiments, holding tanks 120 and 122 may segregate electrolyte that has flowed through cell 100 from electrolyte that has not. However, mixing discharged or partially discharged electrolyte may also be performed.

Electrodes 108 and 110 can be coupled to either supply electrical energy or receive electrical energy from load/source 124. Other monitoring and control electronics, included in load/source 124, can control the flow of electrolyte through half-cells 102 and 104. Multiple ones of cell 100 can be electrically coupled (e.g., "stacked") in series to achieve higher voltage, in parallel in order to achieve higher current, or both.

Figure 2:
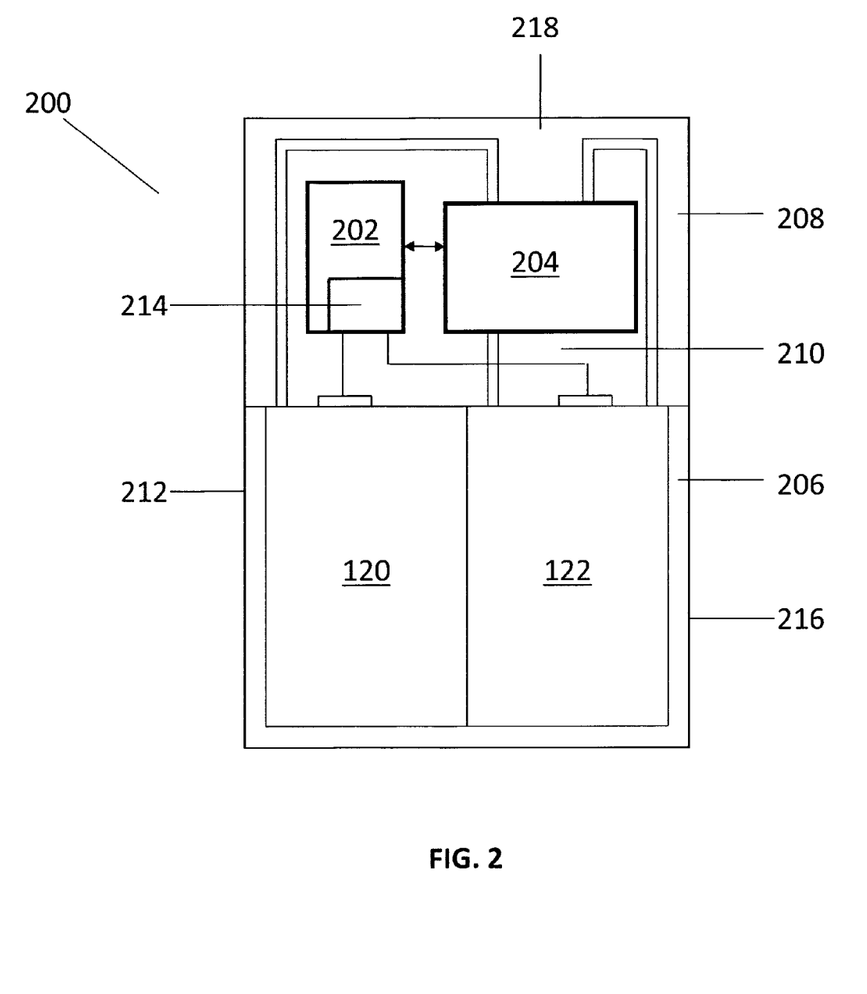
FIG. 2 illustrates an enclosure layout consistent with embodiments of the present invention.

FIG. 2 illustrates an enclosure layout 200 consistent with some embodiments of the present invention. As shown in FIG. 2, flow battery system 210 is housed in an enclosure 212. Flow battery system 210 includes a cell stack 204 coupled to holding tanks 120 and 122 so that electrolyte (not shown) is flowed through each cell of cell stack 204, as was described with respect to FIG. 1. Electronics 202 monitors and controls the charge and discharge of stack 204. Consistent with embodiments of the present invention, electronics 202 can also include a thermal controller 214 that monitors and controls the temperature of flow battery system 210.

As is shown in FIG. 2, enclosure 212 includes a lower section 206 and an upper section 208. Lower section 206 can house, for example, holding tanks 120 and 122. Upper section 208 can house, for example, stack 204, electronics 202, and all other wiring, plumbing, and other components (not shown) of flow battery system 210.

Consistent with the present invention, enclosure 212 is an integral part of the thermal management of flow battery system 210. As shown in FIG. 2, a fluid blanket 216 is created about holding tanks 120 and 122 in lower section 206 and about stack 204 and a fluid blanket 218 is created about electronics 202 in upper portion 208. Fluid blankets 216 and 218 may be air blankets, which are utilized to thermally control the temperature. In some embodiments, however, fluid blankets 216 and 218 may be water, oil, or other fluid that can be utilized to thermally regulate the interior of enclosure 212. In some embodiments, fluid blankets 216 and 218 may be fluidically coupled so that fluid flow about tanks 120 and 122 in lower section 206 and fluid flow about electronics 202 in upper portion 208 are coupled.

Flow battery system 210 can be of any size, so enclosure 212 can be of any dimensions or shape that can house flow battery system 210.

A flow battery efficiently operates within a range of temperatures, for example between about 30° C. and about 50° C. However, the flow battery may experience a thermal environment that varies widely over time. For example, temperatures may be hot during the day and cold at night, varying by tens of degrees over the course of a 24-hour period. Nonetheless, the temperature of the electrolyte in holding tanks 120 and 122 and the temperature of the electronics 202 and stack 204 should be maintained within an efficient operating range of flow battery system 210.

Figure 3:
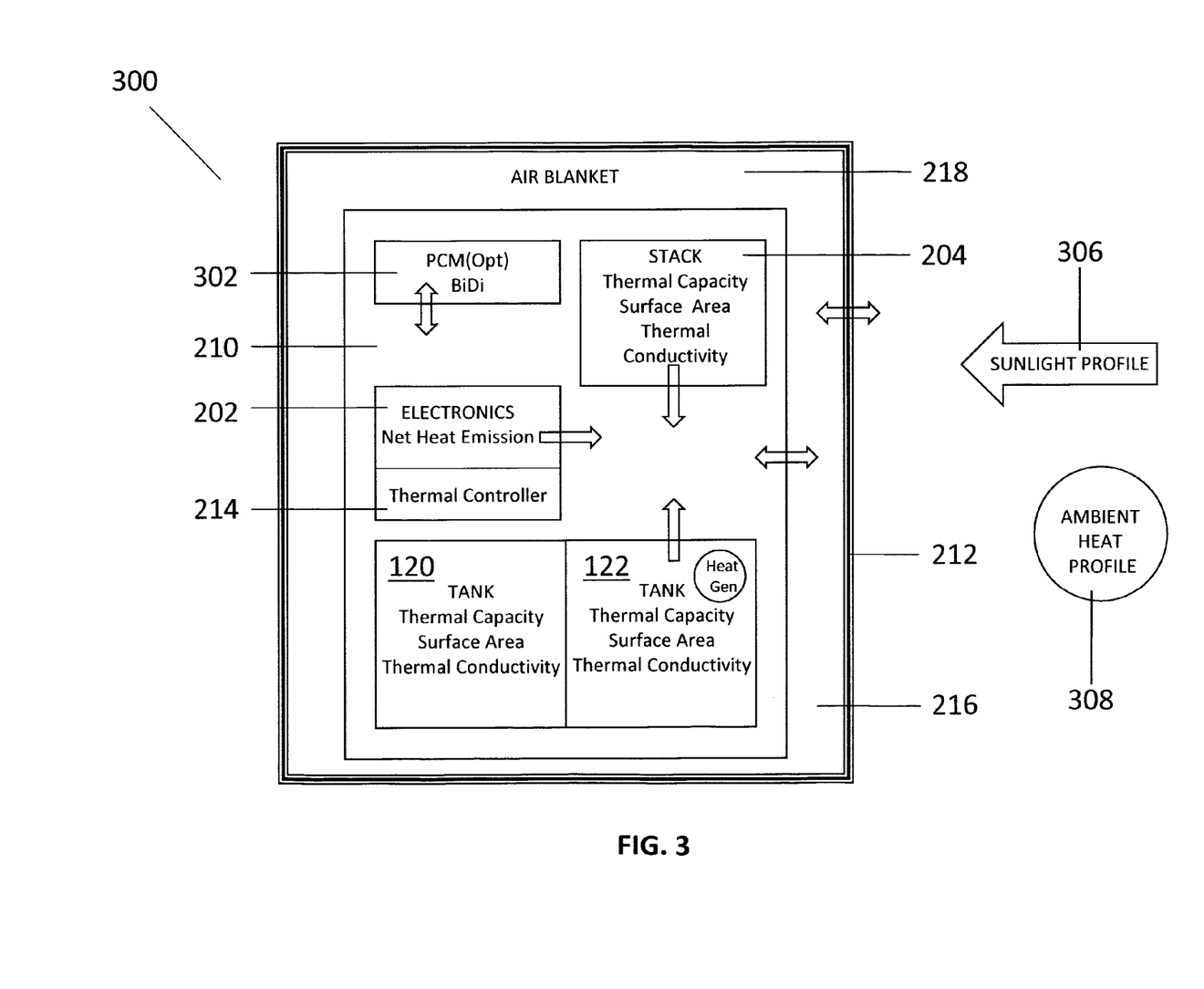
FIG. 3 illustrates a block diagram of a thermal management system consistent with embodiments of the present invention.

FIG. 3 illustrates the thermal considerations 300 of flow cell battery system 210. As shown in FIG. 3, heat is generated by stack 204 and electronics 202 during charging and discharging of flow battery system 210. During operation, for example, a flow battery generates heat due to inefficiencies in energy conversion. Heat is retained and emitted by tanks 120 and 122 as the electrolytic fluids are flowed through stack 204. Further, heat is transferred in and out of flow battery system 210 from the ambient 308 and from direct solar heating 306. Typically, solar heating 306 has a sinusoidal profile which peaks at mid day. Ambient 308 typically has a triangular profile as the temperature rises and falls throughout the day. Enclosure 212 can be a thermal barrier, which may be reflective on the outside and may include insulation material, both inside and outside of enclosure 212, which helps retain heat when the temperature of ambient 308 is below the operating range of flow battery system 210 and helps prevent heating from ambient 308 when the temperature of ambient 308 is above the operating range of flow battery system 210. The electrolyte in tanks 120 and 122 is heated by resistive loss in stack 204, heat loss due to recombination, and heating due to pumping. Tanks 120 and 122 are typically the primary radiators of heat and the largest heat sinks inside of enclosure 212.

As is illustrated in FIG. 3, heat is conducted into and out of enclosure 212 by fluid blankets 216 and 218. Fluid flow in fluid blankets 216 and 218 is controlled by thermal controller 214 in electronics 202.

Some embodiments of the invention may include a phase change material (PCM) 302 to increase the specific heat capacity of flow battery system 210. In environments where the temperature variation over a twenty-four hour period is large, PCM 302 may store thermal energy during the day time when temperatures can be higher and dissipate the thermal energy during the night time when temperatures can be lower. Thus, PCM 302 can contribute to maintaining the flow battery system 210 within its efficient operating range at night, without necessarily using energy to operate a separate a heating system.

PCMs 302 can store large amounts of thermal energy per unit mass by virtue of a latent heat of phase transition at a certain temperature. PCM 302 can be any material that undergoes a phase change (e.g., typically liquid to solid or solid to liquid) while absorbing, or emitting, heat. PCM 302 can undergo the transition at any temperature, including temperatures within the efficient operating range of the flow battery system 210. Examples of PCM 302 include organics and fatty acid based materials, salts, or other materials. Sodium phosphate dibasic ($Na_2HPO_4$), for example, has a transition temperature of about 48° C. and can be utilized to absorb heat at temperatures at or above the transition temperature and to emit heat at temperatures below the transition temperature. Certain embodiments of the PCM 302 change phase between 10° C. and 40° C., for example, potassium phosphate monobasic ($KH_2PO_4$).

As is illustrated in FIGS. 2 and 3, heat is conducted about enclosure 212 by flowing fluids through fluid blankets 216 and 218. Some embodiments consistent with the present invention utilize air in fluid blankets 216 and 218. In those embodiments, the air in blankets 216 and 218 is moved by blowers or fans. In systems that utilize fluids other than air, appropriate pumping systems and heat exchange systems can be utilized. As discussed above, blankets 216 and 218 may be in fluidic communication with each other.

Figure 4:
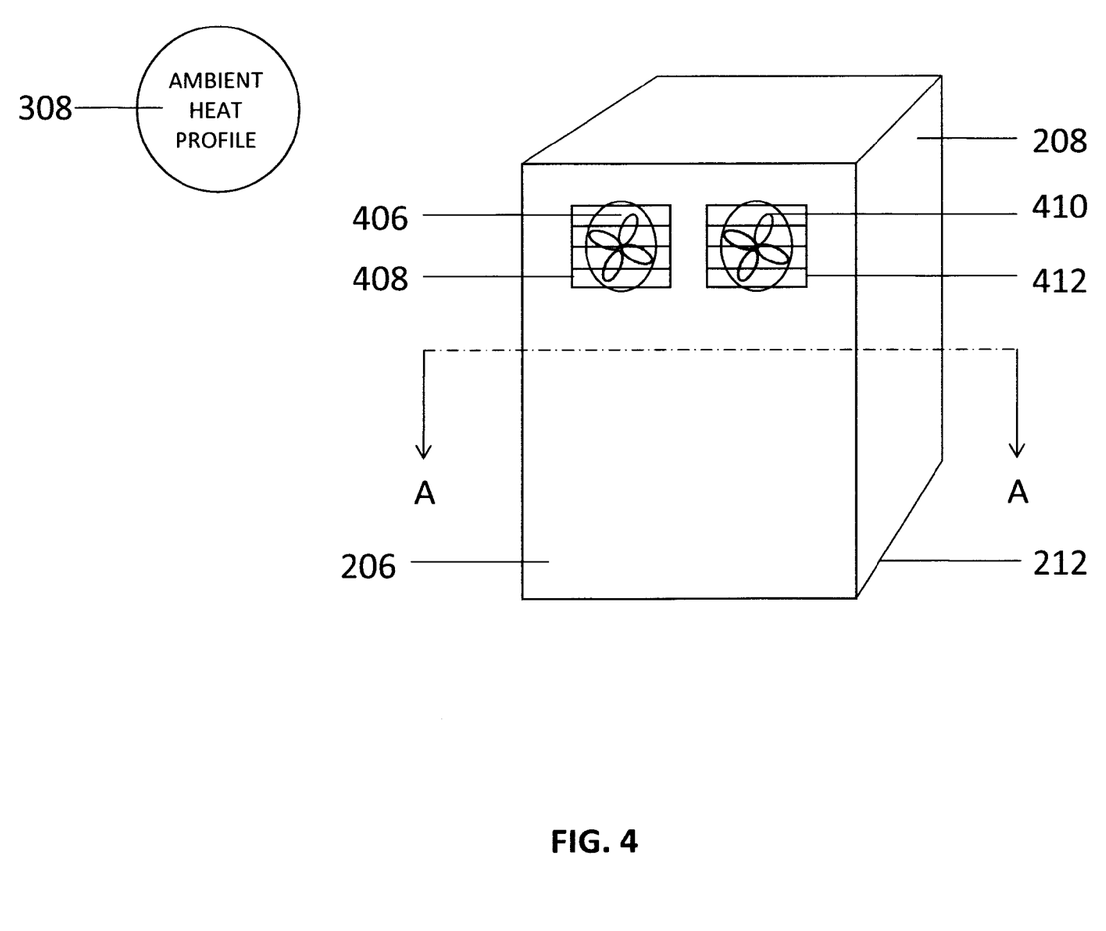
FIG. 4 an enclosure consistent with embodiments of the present invention.

FIG. 4 illustrates an enclosure 212 that is consistent with embodiments of the present invention. As shown in FIG. 4, top portion 208 of enclosure 212 includes vents 408 and 412 with fans 406 and 410. In some embodiments, fans 406 and 410 can be variable speed fans. Furthermore, in some embodiments fans 406 and 410 can flow air both in and out of enclosure 212. As such, heat can be carried by the flow of air into enclosure 212 from ambient 308 or out of enclosure 212 to ambient 308.

Figure 5A:
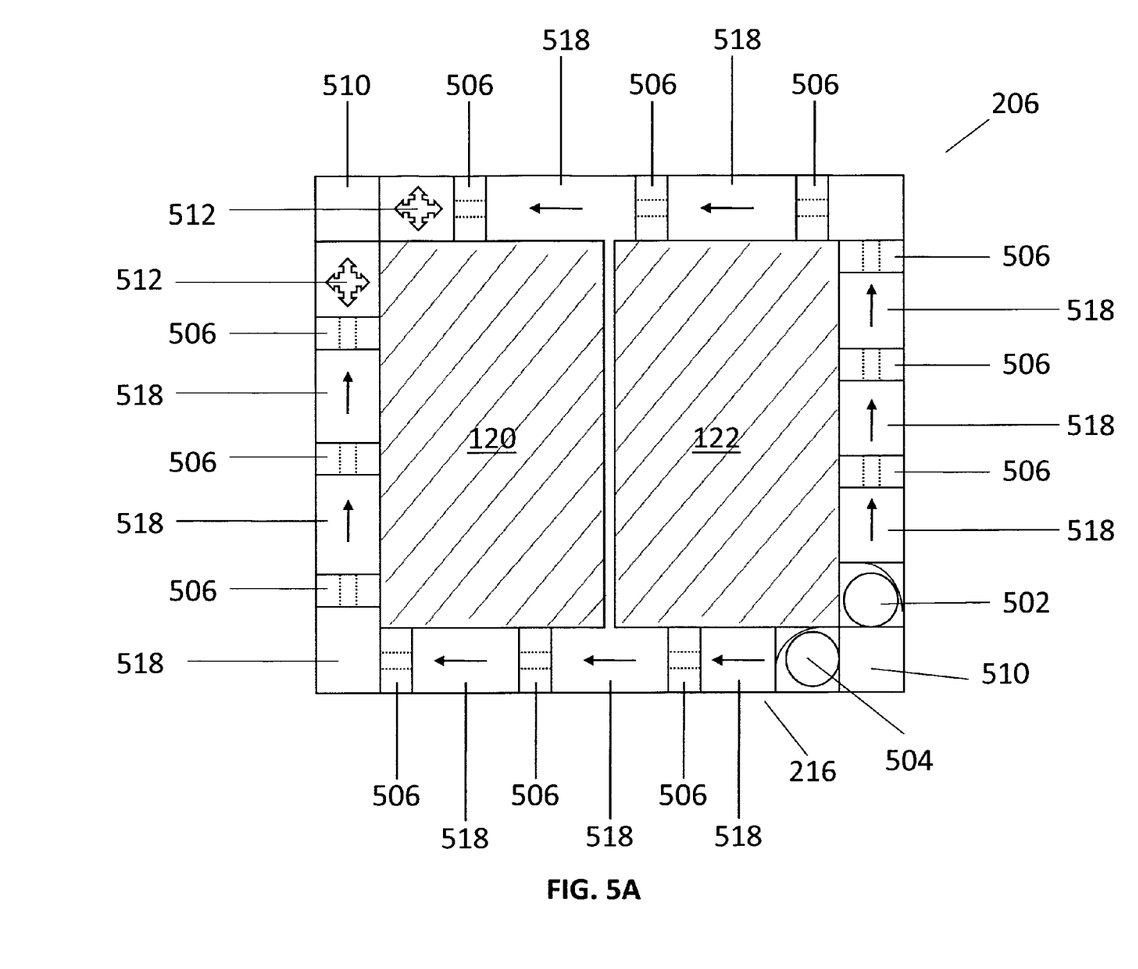
FIGS. 5A and 5B illustrates a bottom block of an enclosure consistent with embodiments of the present invention.
Figure 5B:
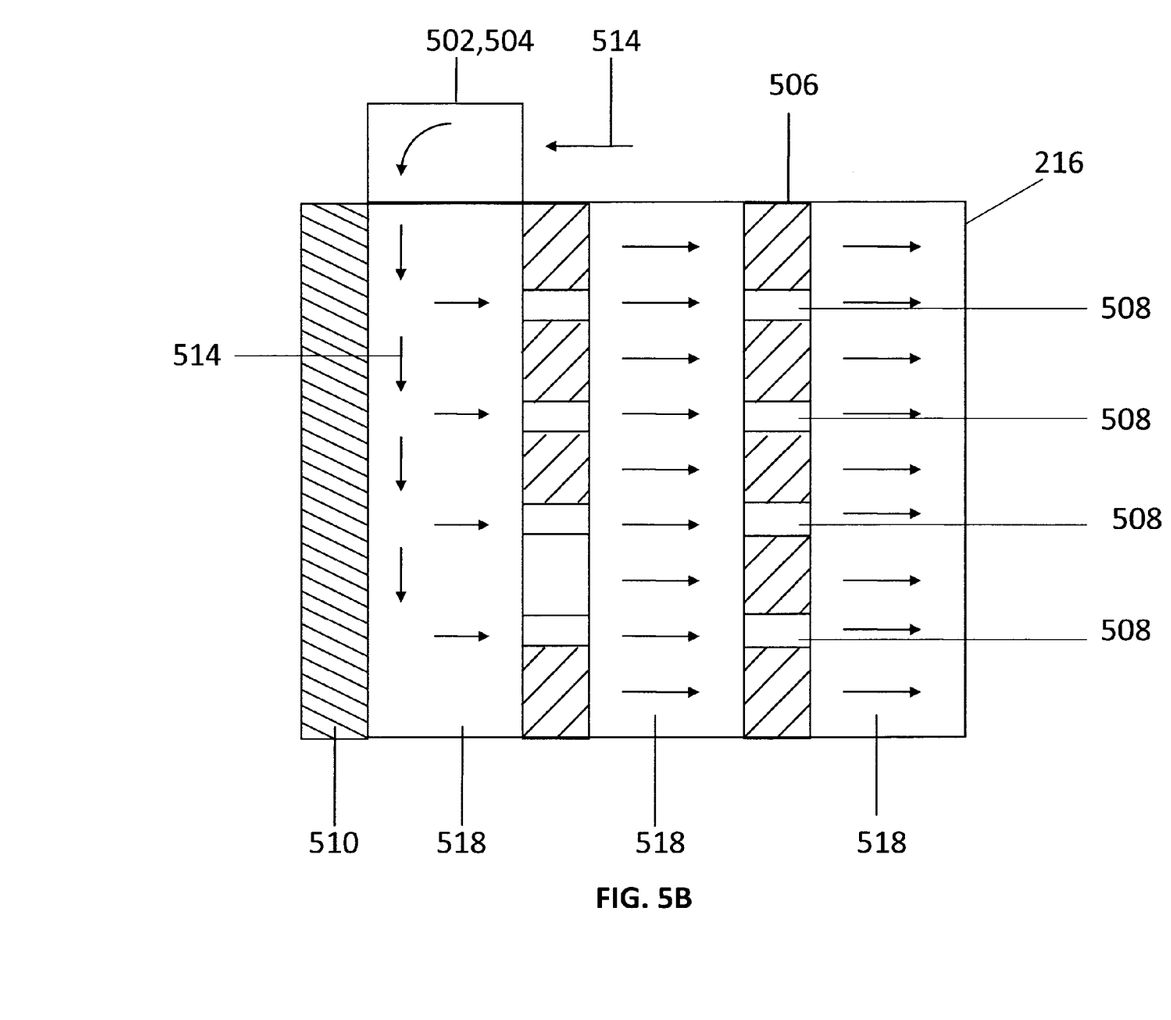

FIG. 5A shows a view of enclosure 212 along the direction A-A' illustrated in FIG. 4. FIG. 5A, therefore, illustrates a top-down view of bottom portion 206 of enclosure 212. As such, tanks 120 and 122 are positioned with air blanket 216 allowing for air flow around tanks 120 and 122. Ribs 506 are positioned between the sides of enclosure 212 and tanks 120 and 122. Ribs 506 can be, for example, welded to the sides of enclosure 212 and may include a gasket type material in contact with tanks 120 and 122 in order to form a seal. As shown in FIG. 5B, ribs 506 are elongated, positioned such that the long dimension is oriented vertically in bottom portion 206, and include passageways 508 through which air, or in some embodiments another fluid, can be flowed. As shown in FIG. 5A, three ribs 506 are positioned along each side of the rectangular enclosure 212, however any number of ribs 506 can be utilized on each side of enclosure 212. In general, enclosure 212 can be of any geometric shape appropriate to house the flow battery system 210.

As shown in FIG. 5A, blowers 502 and 504 blow air in opposite directions around lower section 206. Stoppers 510, positioned in the corner with blowers 502 and 504 and in the opposite corner, prevent air driven by blower 502 from interfering with air driven by blower 504, and vice-versa. In some embodiments, bottom portion 206 is sealed from upper portion 208 so that air circulating around bottom portion 206 is prevented from entering upper portion 208 except at exit holes 512. Exit holes 512 positioned opposite blowers 502 and 504 allow air to exit from lower portion 206 into upper portion 208. In some embodiments, fluid drawn into blowers 502 and 504 from fluid blanket 218 contributes to fluid blank 216 and fluid exiting from fluid blank 216 through exit holes 512 enters fluid blanket 218.

Ribs 506, with air passages 508, and vertical free spaces 518 allow for uniform flow of air around tanks 122 and 124. Ribs 506 operate as a flow resistor so that the resistance to fluid flow in the vertical free spaces 518 between ribs 506 is much lower than the resistance to flow through passageways 508 in ribs 506, resulting in a flow distribution that is uniform. In some embodiments, ribs 506 can be hollow and have a plurality of passageways 508. In some embodiments there may be fifteen of passageway 508 equally spaced along each rib 506. In-between ribs 506 are vertical free spaces 518 for propagating the fluid. While ribs 506 constrict the air flow in the horizontal direction, vertical free spaces 518 allows fluid to homogenize in the vertical direction. The ribs and vertical free spaces 518 form a manifold to provide a uniform flow of fluid around tanks 120 and 122.

In some embodiments of the enclosure described above, with fifteen passageways 508 of 5 mm diameter equally spaced along ribs 506, with five ribs 506 per side of enclosure 212, and blowers 502 and 504 each operating at 15 CFM, the pressure drop between blowers 502 and 504 and exit holes 512 is about 4 mbars. The number and diameter of passageway 508 are designed to avoid creating stagnant air gaps between tanks 120 and 122 and enclosure 212 that may result in thermal heating in that area. Contact may be made between tanks 120 and 122 and enclosure 212 through ribs 506.

Referring now to FIG. 5B, a cross-sectional view of air blanket 216, blower 502 or 504 first pushes fluid 514 (e.g., air) into vertical free space 518, which has lower resistance than passageways 508. Then the air column moves around tanks 120 and 122, alternating through passageways 508 in ribs 506 and vertical free spaces 518.

Some embodiments of the present invention move thermal energy or heat from the tanks 120 and 122 to the outside of enclosure 212 (i.e., ambient) efficiently. Air or other fluid moves on exterior surfaces of tanks 120 and 122 with a high velocity. Higher velocities result in larger transfer rates. Referring to FIGS. 5A-B, embodiments of the present invention include a manifold structure (i.e., ribs 506 and vertical free spaces 518) which uniformly distributes fluid over a large amount of tank 120 and 122 surface. By changing the velocity of the fluid blanket, the rate of heat transfer can be effectively controlled. This is called an "active fluid blanket." Referring back to FIG. 3, the temperature of electrolyte 130 and 132 in tanks 120 and 122 can be maintained at a temperature within a range of temperatures from significantly higher than to just above a temperature outside of enclosure 212.

Figure 6:
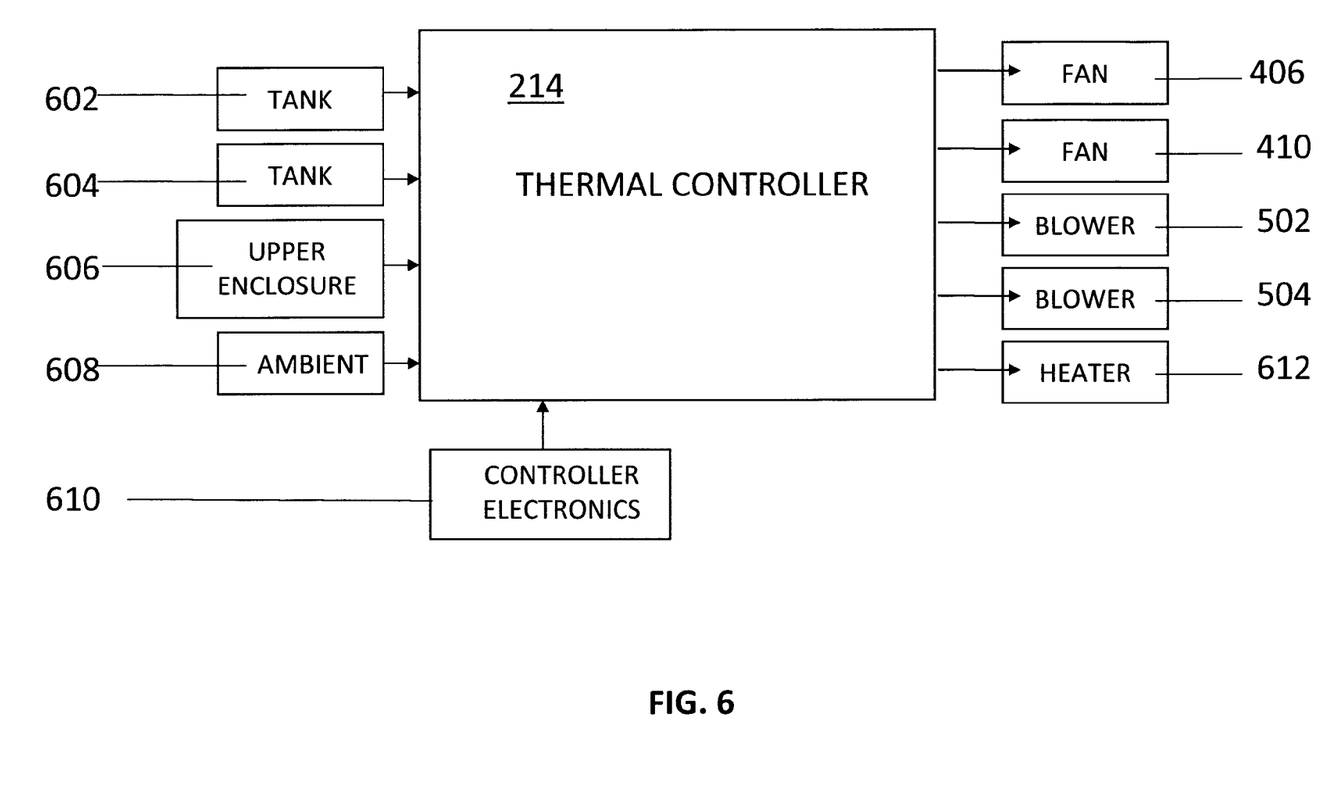
FIG. 6 illustrates a block diagram of a thermal controller consistent with embodiments of the present invention.

FIG. 6 illustrates an embodiment of thermal controller 214. As is illustrated in FIG. 6, temperature sensors can be positioned throughout enclosure 212 in order to monitor the temperatures. Temperature sensors can be, for example, thermometers, thermocouples, thermistors, resistance temperature detectors, and the like. In the embodiment shown in FIG. 6, temperature sensor 602 monitors the temperature of electrolyte in tank 120, temperature sensor 604 monitors the temperature of electrolyte in tank 122, temperature sensor 606 monitors the temperature inside upper enclosure 208, and temperature sensor 608 monitors the temperature of ambient 308. Further, input signals 610 may be received from the remainder of control electronics 202. Input signals 610, for example, may alert thermal controller 214 of pending charge and discharge events in order that thermal events can be predicted.

In turn, based on input signals 610 and signals from temperature sensors 602, 604, 606, and 608, thermal controller 214 operates fans 406 and 410, blowers 502 and 504, and heater 612. In some embodiments, heater 612 can maintain the electrolyte temperature when the temperature outside the enclosure is such that the minimum desired electrolyte temperature otherwise cannot be maintained. In some embodiments, thermal controller 214 can be a microprocessor, hardware, or combination thereof executing software (e.g., code, program, and instructions) The software may be stored on a computer-readable medium.

In some embodiments, controller 214 turns on blowers 502 and 504 once temperature sensors 602 and 604 reach a predetermined level and turns blowers 502 and 504 off once temperature sensors 602 and 604 are lowered past another predetermined level, creating a hysteresis effect. Similarly controller 214 turns fans 406 and 410 on when temperature sensor 606 reaches a first predetermined level and turns fans 406 and 410 off when temperature sensor 606 is reduced to a second predetermined level, creating a hysteresis effect. In some embodiments, electrolyte temperature can be maintained between 35° C. and 55° C., and the temperature in upper portion 208 maintained between 25° C. and 45° C. As such, controller 214 can, for example, turn fans 406 and 410 on when temperature sensor 606 detects a temperature of about 40° C. and turns blowers 502 and 504 on when temperature sensors 602 and 604 detects an electrolyte temperature of about 50° C. Similarly, fans 406 and 410 can be shut off when the temperature in upper portion 208 drops below a set temperature and blowers 502 and 504 may be shut off when the temperature of lower portion 206 drops below another set temperature.

Figure 7A:
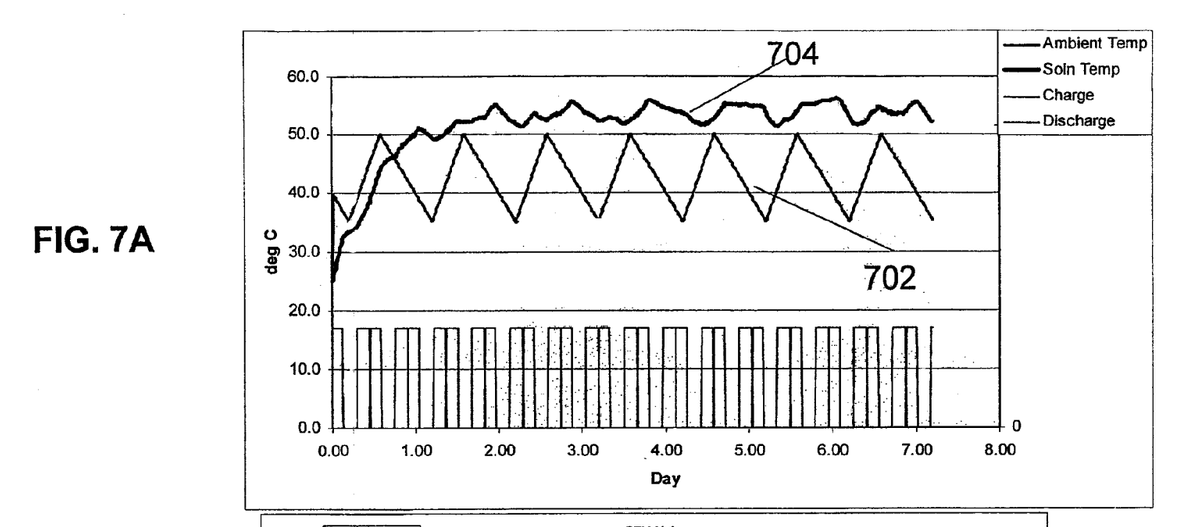
FIGS. 7A and 7B illustrate a thermal cycle for summer temperatures that can be attained with some embodiments consistent with the present invention.
Figure 7B:
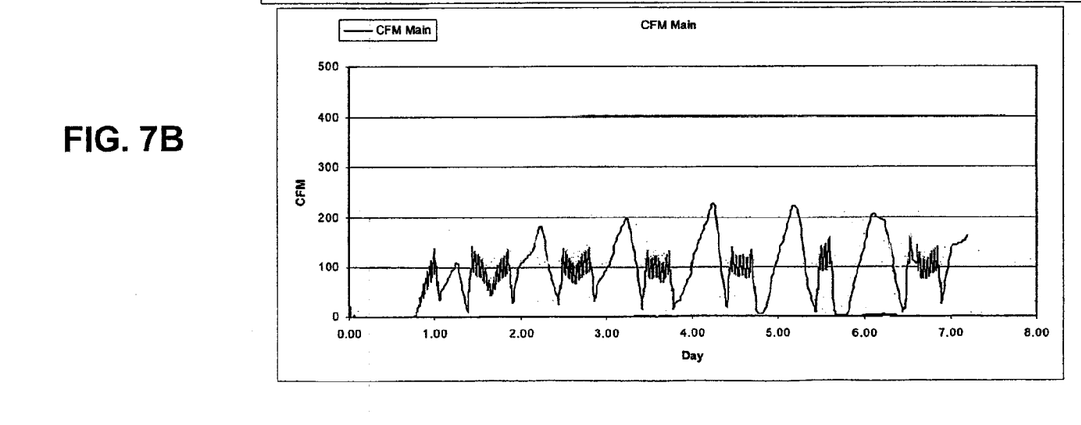
Figure 8A:
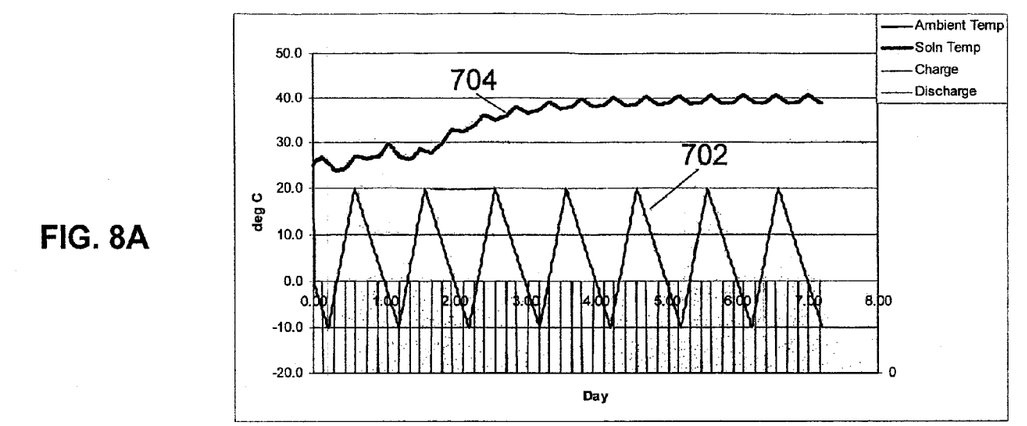
FIGS. 8A and 8B illustrate a thermal cycle for winter temperatures that can be attained with some embodiments consistent with the present invention.
Figure 8B:
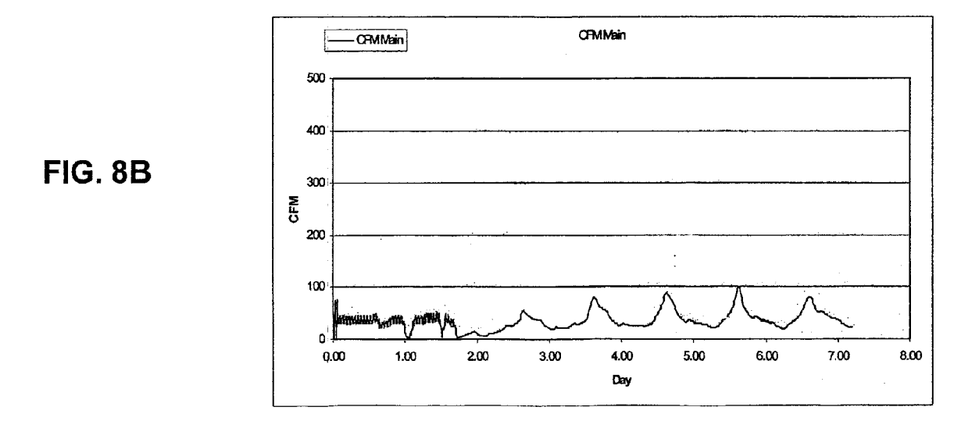

Controller 214, then, may control fans 406 and 410 and blowers 502 and 504 as a function of temperature as measured by temperatures sensors 602, 604, and 606. FIGS. 7A and 7B illustrate temperature controller 214 over several days of operation, including several charge/discharge cycles per day. FIG. 7A illustrates summer conditions in a hot climate, with ambient temperature 308 illustrated by curve 702. The temperature of electrolytes is illustrated by curve 704. FIG. 7B illustrates the operation of fans 406 and 410. FIGS. 8A-B illustrate the operation of thermal controller 214 during winter conditions.

In some embodiments of temperature controller 214, temperature controller 214 may anticipate temperature changes in enclosure 212 and act accordingly. Temperature controller 214 may anticipate temperature conditions using forecasts based upon climate data from past trends, past measurements, current measurements, satellite images and the like. Temperature controller may access climate data either stored locally or through wired and/or wireless communications. For example, temperature controller 214 may anticipate average daily ambient temperature changes and, for example, allow a slightly elevated temperature in anticipation of a particularly cold nighttime temperature. Conversely, temperature controller 214 may bring the temperature down during the night in anticipation of heating during the day. Additionally, temperature controller 214 may anticipate the heat generated by charging and discharging events and act accordingly. In some embodiments, temperature controller 214 may adaptively control fans 406 and 410 and blowers 502 and 504 in response to temperature sensors 602, 604, 606, and 606 and to signals 610 so that the thermal response of enclosure 212 can be more accurately predicted.

It will be apparent to those skilled in the art that various modifications and variations can be made to the sensor for measuring multiple properties of a fluid. Other embodiments consistent with the present invention will be apparent to those skilled in the art from consideration of the specification and practice of the invention disclosed herein. It is intended that the specification and examples be considered as exemplary only. Accordingly, the invention should only be limited by the following claims.

What is claimed is:

1. A flow cell battery comprising:
    at least one redox flow cell;
    at least one tank for holding an electrolyte solution, wherein at least one tank is coupled to the redox flow cell such that electrolyte solution is supplied from at least one tank to the redox flow cell during use;
    an enclosure at least partially surrounding at least one tank, wherein the enclosure defines a fluid channel at least partially surrounding at least one tank, the enclosure comprising:
        a lower portion at least partially surrounding the at least one tank and including a first fluid blanket; and
        an upper portion at least partially surrounding the at least one redox cell and including a second fluid blanket; and
    a manifold disposed between the enclosure and at least one tank,
    the manifold directing circulation of a fluid around at least one tank during use.

2. The flow cell battery of claim 1, wherein the fluid is air.

3. The flow cell battery of claim 1, wherein the enclosure at least partially surrounds at least one redox flow cell.

4. The flow cell battery of claim 1, wherein the enclosure comprises a temperature controller, the temperature controller directing the flow of fluid through the manifold.

5. The flow cell battery of claim 1, wherein the enclosure further comprises a phase change material (PCM), the PCM increasing the specific heat of the flow cell battery.

6. The flow cell battery of claim 1, wherein the enclosure further comprises a heater that can raise the temperature of the electrolyte solution in at least one tank.

7. The flow cell battery of claim 1, further comprising:
    a first temperature sensor that measures a temperature of the electrolyte solution inside the at least one tank; and
    a second temperature sensor that is coupled to the enclosure and measures a temperature of the outside of the enclosure.

8. The flow cell battery of claim 1, wherein the manifold includes vertical free spaces between ribs having passages.

9. The flow cell battery of claim 1, wherein the upper portion further at least partially surrounds a temperature controller, the manifold further comprising:
- at least one blower that circulates the fluid through the fluid channel;
- at least one fan positioned in the upper portion to circulate the fluid into or out of the upper portion of the enclosure;
- a first temperature sensor that monitors a temperature of the lower portion; and
- a second temperature sensor that monitors a temperature of the upper portion,
- wherein the temperature controller controls operation of the at least one blower and the at least one fan in response to the first temperature sensor and the second temperature sensor.

10. The flow cell battery of claim 9, wherein the temperature controller further controls operation of the at least one blower and the at least one fan in response to anticipated thermal events.

11. The flow cell battery of claim 1, wherein the manifold comprises a fluid exit that allows fluid to exit the fluid channel during use.

12. The flow cell battery of claim 1, further comprising:
- a temperature controller;
- a first temperature sensor that monitors a temperature of the electrolyte solution in at least one tank; and
- a second temperature sensor that monitors an ambient temperature external to the enclosure,
- wherein the temperature controller controls flow of fluid through the fluid channel in response to the first temperature sensor and/or the second temperature sensor.

13. The flow cell battery of claim 1, wherein the redox flow cell comprises:
- an anode half cell comprising an anolyte solution;
- a cathode half cell comprising a catholyte solution;
- an anolyte tank for storing anolyte solution; and
- a catholyte tank for storing a catholyte solution;
- wherein the enclosure at least partially surrounds the anolyte tank and the catholyte tank forming a fluid channel at least partially surrounding the anolyte tank and the catholyte tank.

14. The flow cell battery of claim 1, further comprising:
- a first blower configured to direct a fluid through a first portion of the fluid channel;
- a second blower configured to direct fluid through a second portion of the fluid channel;
- wherein the manifold comprises:
    - a first exit that allows fluid in the first portion of the fluid channel to exit the flow cell battery;
    - a second exit that allows fluid in the second portion of the fluid channel to exit the flow cell battery; and
    - one or more stops separating the first portion of the fluid channel from the second portion of the fluid channel.

15. A flow cell battery comprising:
- at least one redox flow cell;
- at least one tank for holding an electrolyte solution, wherein at least one tank is coupled to the redox flow cell such that electrolyte solution is supplied from at least one tank to the redox flow cell during use;
- an enclosure at least partially surrounding at least one tank, wherein the enclosure defines a fluid channel at least partially surrounding at least one tank, the enclosure comprising:
    - a lower portion at least partially surrounding the at least one tank and including a first fluid blanket; and
    - an upper portion at least partially surrounding the at least one redox cell and including a second fluid blanket;
- a manifold disposed between the enclosure and at least one tank, the manifold directing circulation of a fluid around at least one tank during use; and
- at least one blower that circulates the fluid through the fluid channel.

* * * * *